Patented Dec. 29, 1942

2,306,779

UNITED STATES PATENT OFFICE 2,306,779

TREATMENT OF RUBBER

Clyde Coleman, Montclair, N. J., assignor to United States Rubber Company, New York, N. Y., a corporation of New Jersey No Drawing. Application March 28, 1939,
Serial No. 264,596

6 Claims. (Cl. 260—800)

This invention relates to the treatment of rubber and similar oxidizable materials, and more particularly to a new class of age resistors.

An object of the invention is to provide a new class of anti-oxidants or age resistors for organic substances which tend to deteriorate by absorption of oxygen from the air, for example, goods of rubber or allied gums, unsaturated fatty oils such as unsaturated vegetable oils, essential oils, petroleum oils and their derivatives such as gasolines, soaps, aldehydes, synthetic resins, turpentine, paints and varnishes containing drying oils, and the like. A further object of the invention is to provide chemicals which additionally act as flex-improvers or anti-flex cracking agents for vulcanized rubber such as tire treads, which undergo repeated strains during use. Further objects will be apparent from the following description.

According to the invention, rubber and the like, as aforesaid, is treated with a compound having the general formula R—A—R' where A is an aliphatic chain of at least two carbon atoms, at least one of whose carbon atoms may be joined to a hydroxyl radical, the terminal carbon atoms of the chain each being respectively joined to the nitrogen of an N-heterocyclic radical R and R' respectively. Because there is a plurality of carbon atoms in the chain connecting to two nitrogen atoms the compounds are very stable and they are further distinguishable as having substantially no vulcanization accelerating properties.

Among the many examples coming within the scope of the present invention and useful for the purpose are the following:

(1) Alpha, beta - di(2,5 - dimethyl - pyrryl) - ethane

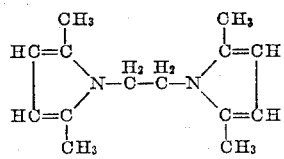

in which R and R' are the same nitrogen-containing heterocyclic radical, and A is the ethylene radical to which the heterocyclic radicals are attached through their nitrogen atoms.

(2) Alpha, gamma-di-(2,5-dimethyl-pyrryl) - beta-hydroxy-propane,

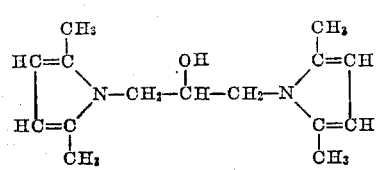

in which A has a substituent hydroxyl group.

(3) Alpha-piperidyl-beta-(2,5-dimethyl-pyrryl)-ethane,

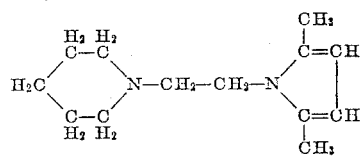

in which R and R' are unlike heterocyclic radicals.

(4) Piperidyl-1-morpholyl-3-propanol-2

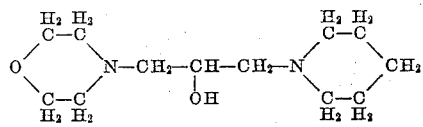

This exemplifies a compound having a hydroxy-substituted alkylene radical attached to two different heterocyclic nitrogen-containing radicals.

As further examples, R or R' may be:
(1) Tetrahydro-quinolyl
(2) Tetrahydro-iso-quinolyl
(3) 2,4-dimethyl-pyrryl
(4) 2-methyl-4-ethyl-pyrryl
(5) Pyrryl
(6) Pyrrolinyl

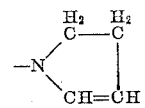

(7) Pyrrolydinyl

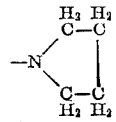

(8) Morpholyl
(9) Indolyl
(10) Alpha-methyl-indolyl
(11) Alpha-alpha-dimethyl-indolinyl
(12) Carbazyl
(13) Tetrahydro-carbazolyl
(14) Phenanthro-benzo-pyrrolyl
(15) Indazolyl
(16) Piperidinyl
(17) Pipecolyl
(18) Tetrahydro-quinaldinyl
(19) Di-hydro quinolyl
(20) 2,5-di-methyl-pyrrolinyl

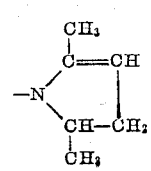

(21) 2,5-di-methyl-pyrrolidinyl

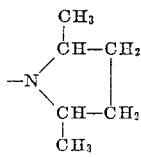

(22) 2,3-di-methyl-pyrryl
(23) 2-methyl-3-ethyl-pyrryl

In the compounds of the invention where R and R' are as disclosed above, A may be any of the following:

(1)   $-CH_2-CH-CH_2-$
              $|$
              $OH$ (2)   $-CH_2-CH-CH_2-$
              $|$
              $CH_3$ (3)   $-CH_2-CH_2-CH-CH_2$
                       $|$
                       $OH$ (4)   $-CH_2-CH_2-CH-CH_2-$
                       $|$
                       $CH_3$ (5)   $-CH_2-CH-CH-CH_2-$
               $|$    $|$
               $CH_3$ $CH_3$

Certain of the above class of compounds may be made either by reacting one mole of an alkylene di-halide with two moles of the heterocyclic base which it is desired to substitute upon the aliphatic radical, or by treating the appropriate alkylene diamine with a reagent capable of condensing therewith to form the heterocyclic ring.

As an example of the first type of reaction, alpha, beta-di-pyrrolidinyl ethane,

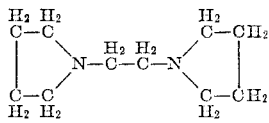

may be made by reacting one mole of ethylene bromide with two moles of pyrrolidine in the presence of an inorganic base, such as sodium carbonate, or in the presence of a tertiary amine, such as dimethyl-aniline. An example of the second type of reaction is illustrated in the formation of alpha,beta-bis-(2,5-di-methyl-pyrryl)-ethane by condensing one mole of ethylene diamine with two moles of acetonyl-acetone.

In certain cases the compounds may be obtained by the reduction of other compounds made by one of the above methods. For instance, alpha,beta-di-pyrrolidinyl-ethane may be made by reducing the corresponding alpha,beta-di-pyrryl-ethane.

A convenient method of forming members of this class having unlike heterocyclic nitrogen-containing radicals is illustrated as follows:

A chloro-alkyl amine, such as beta-chloro-ethyl amine, is treated with phthalic anhydride to form beta-chloro-ethyl-phthalimide, so as to mask the amino group. This is then treated with, for instance, piperidine, to form beta-piperidyl-ethyl phthalimide. The phthalic acid radical is then removed by hydrolysis and the resulting alpha-amino-beta-piperidyl-ethane is condensed with one mole of acetonyl-acetone to form alpha-(2,5-dimethyl-pyrryl)-beta-piperidyl-ethane.

In the table below are given data showing the effectiveness of certain of these chemicals in preventing cracking in bent rubber vulcanizates exposed to the sun. The test was made by bending strips of tread or gum stocks about 4 inches long, ¾ inch wide and .04 inch thick, into loops, fastening them to a board and exposing them to the sun. The tread stock was typical of its class, containing carbon black, softeners, antioxidant, stearic acid, sulfur and zinc oxide, and mercapto-benzothiazole as accelerator. The gum stock contained 100 parts of pale crepe, 10 of zinc acid, 3 of sulfur, 2 of stearic acid, and 0.5 of mercaptobenzothiazole. The cures were for 60 minutes at 30 pounds steam pressure.

In the table, the symbols have the following meanings:

+++ No cracking
++ Very slight or negligible cracking
0 Same as the control

The control was, of course, a stock similar to the one under test, but containing no added chemical, and, was always very badly cracked even after only one day's exposure in the test.

|  | Tread | Gum | Tread | Gum | Tread | Gum |
|---|---|---|---|---|---|---|
|  | After 7 days | | After 21 days | | After 255 days | |
| Di(2,5-dimethylpyrryl) ethane | +++ | +++ | +++ | +++ | +++ | +++ |
|  | After 6 days | | After 33 days | | After 86 days | |
| 1,2-di-morpholylethane | ++ | +++ | 0 | +++ | No test | +++ |

The invention may be applied to the preservation of natural rubbers, as well as artificially prepared rubbers, including reclaims and latices of such rubbers.

It is also to be understood that other desired filling and compounding ingredients may be incorporated along with the preservative, for example, in the case of rubber, there may be incorporated other accelerators, softeners, etc.

The age resistor may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A process of inhibiting the deterioration of organic substances which tend to deteriorate by absorption of oxygen from the air which comprises treating the same with a compound having the general formula R—A—R' where A is an aliphatic group containing a plurality of carbon atoms selected from the group consisting of aliphatic hydrocarbon radicals, and hydroxy-substituted aliphatic hydrocarbon radicals; and R and R' are each a mono-nitrogen-containing heterocyclic ring containing 4 to 5 nuclear carbon atoms and belonging to the class consisting of the pyrrols, oxazines, and piperidines, and in which the nitrogen is a member of the ring and joined respectively to terminal carbon atoms of the aliphatic group.

2. A process of inhibiting the deterioration of organic substances which tend to deteriorate by absorption of oxygen from the air which comprises treating the same with a di-(2,5-dialkyl-pyrryl)-alkane in which the alkane group contains a plurality of carbon atoms, the terminal carbon atoms thereof being respectively joined to the nitrogen of the pyrryl group.

3. A process of inhibiting the deterioration of organic substances which tend to deteriorate by absorption of oxygen from the air which comprises treating the same with a di-(2,5-dialkyl-pyrryl)-ethane having each of its carbon atoms respectively joined to the nitrogen of the pyrryl group.

4. A process of inhibiting the deterioration of organic substances which tend to deteriorate by absorption of oxygen from the air which comprises treating the same with a di-(2,5-dimethyl-pyrryl)-ethane having each of its carbon atoms respectively joined to the nitrogen of the pyrryl group.

5. An organic substance which tends to deteriorate by absorption of oxygen from the air containing an age resistor having the general formula R—A—R' where A is an aliphatic chain containing a plurality of carbon atoms selected from the group consisting of aliphatic hydrocarbon radicals, and hydroxy-substituted aliphatic hydrocarbon radicals, the terminal carbon atoms of the chain each being respectively joined to the nitrogen of a mono-nitrogen-containing heterocyclic radical R and R' respectively, the heterocyclic ring containing 4 to 5 nuclear carbon atoms and belonging to the class consisting of the pyrrols, oxazines, and piperidines.

6. A vulcanization product of rubber containing an anti-oxidant having the general formula R—A—R' where A is an aliphatic radical containing a plurality of carbon atoms selected from the group consisting of aliphatic hydrocarbon radicals, and hydroxy-substituted aliphatic hydrocarbon radicals; and R and R' are each a mono-nitrogen-containing heterocyclic ring containing 4 to 5 nuclear carbon atoms and belonging to the class consisting of the pyrrols, oxazines, and piperidines, and in which the nitrogen is a member of the ring and joined respectively to terminal carbon atoms of the aliphatic radical.

CLYDE COLEMAN.